Patented Aug. 30, 1949

2,480,627

UNITED STATES PATENT OFFICE 2,480,627

PROCESS OF REACTIVATING A SILICA-ALUMINA CRACKING CATALYST

Ernest A. Bodkin, Mickleton, and James M. Johnson, Woodbury, N. J., assignors to Socony-Vacuum Oil Company, Incorporated, a corporation of New York No Drawing. Application June 6, 1945, Serial No. 597,968

7 Claims. (Cl. 252—412)

This invention relates to a process for reactivating catalysts used in the conversion of hydrocarbons wherein the vapors of a hydrocarbon charge stock are contacted at conversion conditions of temperature and pressure with a solid adsorbent conversion catalyst comprising essentially silica and alumina. More particularly, the invention is concerned with a process in which a catalyst which has suffered serious deterioration of activity is reactivated by a novel method of treatment hereinafter described.

Processes of catalytic conversion of the type to which this invention pertains are well known in the art. Thus, in the catalytic cracking of petroleum hydrocarbons, a porous adsorbent aluminum silicate clay or synthetic silica-alumina catalyst is contacted with hydrocarbon vapors at conversion conditions, for example, 800° F. to 1000° F. at atmospheric or greater pressures. The reaction which takes place is essentially a cracking to produce lighter hydrocarbons, but is accompanied by a number of complex side reactions such as aromatization, polymerization, alkylation and the like. As a result of these complex reactions, a carbonaceous deposit is laid down on the catalyst which is commonly called "coke," although it contains considerable hydrogen and is probably a highly condensed hydrocarbon. The coke tends to seriously impair the catalytic efficiency of the catalyst for the principal reaction and the conversion reaction is therefore suspended after coke, to the extent of a few per cent by weight of catalyst, has accumulated on the catalyst. The catalytic surface is then regenerated by burning the coke in a stream of oxidizing gas and the catalyst is returned to the conversion stage of the cycle.

The catalyst also undergoes a second type of degeneration by reason of changes in the catalyst itself as contrasted with the masking of catalytic surfaces by a coke deposit. As the catalyst is carried through a large number of cycles of alternate conversion and regeneration, the activity following each regeneration becomes progressively less until the activity is too low for economical use of the catalyst. These two types of degeneration differ in the time factor as well as in the nature of the change occurring. Coke deposition, referred to as contamination, is fairly rapid, it being desirable to remove the coke by burning after about 10 to 20 minutes on stream. This burning of the coke will be hereinafter designated as regeneration. On the other hand, the change in basic nature of the catalyst, resulting in lowered activity after regeneration, is a slow change. A catalyst may be in service for 15,000 thirty-minute cycles before becoming so degenerated as to require replacement. For example, a year or more may elapse before a catalyst drops from an initial activity of 38.5, as hereinafter defined, to 25 or 30. This slow degeneration will be referred to as deactivation to distinguish it from contamination.

The commercial practice in the past has been to discard a deactivated hydrocarbon conversion catalyst and employ a fresh charge of new catalyst. By means of the present invention, this practice can be substantially eliminated and the low activity catalyst renewed to approximately its original activity by the particular chemical treatment described herein. It is accordingly the primary object of this invention to return a deactivated catalyst to a higher activity level.

The reactivation is brought about by introducing a zeolitic alkali metal into the deactivated catalyst and subsequently replacing the alkali metal in a base-exchange operation with a metal designed to increase the hydrocarbon conversion efficiency of the catalyst. This is accomplished by soaking the deactivated catalyst in an aqueous solution of an alkali metal compound, preferably the hydroxide or silicate, base exchanging the alkali-treated catalyst with a salt of the desired metal and washing the catalyst free of said salt.

The present invention has established that an alkali metal introduced into a deactivated silica-alumina catalyst, which may be either a naturally occurring clay typified by Superfiltrol clay and fuller's earth or a synthetic silica-alumina composite, is base exchangeable and can be replaced by various other metals such as aluminum, zirconium, thorium, and beryllium to yield hydrocarbon conversion catalysts having a renewed activity.

The activity of the catalyst is a measure of its capacity to catalyze conversion of hydrocarbons and as used throughout the specification and claims is expressed as the percentage conversion of Light East Texas Gas Oil having an A. P. I. gravity of 36.0° and a boiling range of 418 to 714° F. to gasoline having an end point of 410° F. by passing vapors of said gas oil through the catalyst at 800° F., substantially atmospheric pressure, and a feed rate of 1.5 volume of liquid oil per volume of catalyst per hour.

The following examples will serve to illustrate the invention:

EXAMPLE 1

A silica-alumina clay cracking catalyst having an original activity of 38.5 was used over an extended period of time until its activity after a repeated number of regenerations had dropped to 28.9. A volume of 300 cc. of this deactivated catalyst was soaked in 250 cc. of a 4% by weight solution of sodium hydroxide for 24 hours at room temperature, and then water washed free of caustic. The sodium content of the caustic-free catalyst at this point was 0.71%. The catalyst then was treated with 250 cc. of a 19.5% by weight solution of aluminum sulphate for a period of 4 having an activity of 28.9 was soaked in 300 cc. of an 11.1% by weight solution of "N" brand sodium silicate for 24 hours at room temperature. After soaking, the catalyst was treated with three applications of aluminum sulphate as in Example 1 and washed with 200 cc. of water each hour for 75 hours until free from soluble sulphate. The catalyst was dried and found to have an activity of 39.3.

Further examples are given in the following table:

TABLE I

| Example | New Catalyst Silica-Alumina Clay | Deactivated Catalyst Before Treatment | 3 | 4 | 5 | 6 | 7 | 8 | 9 | 10 |
|---|---|---|---|---|---|---|---|---|---|---|
| Vol. of Catalyst, cc | | | 300 | 300 | 300 | 300 | 300 | 300 | 300 | 300 |
| Soaking Soln., Per Cent Weight | | | 10% Sodium Hydroxide | 4% Sodium Hydroxide | 7% Sodium Hydroxide | 10% Sodium Hydroxide | 11.1% Sodium Silicate | 16.1% Sodium Silicate | 21.0% Sodium Silicate | |
| Vol. of Soaking Soln., cc | | | 250 | 250 | 250 | 250 | 250 | 250 | 250 | |
| Time of Soak, Hrs | | | 24 | 48 | 12 | 6 | 12 | 48 | 6 | |
| Base Exchange Soln., Per Cent Wt. of Al₂(SO₄)₃ | | | 19.5 | 19.5 | 19.5 | 19.5 | 19.5 | 19.5 | 19.5 | 19.5 |
| Vol. of Soln. per Application, cc | | | 250 | 250 | 250 | 250 | 250 | 250 | 250 | 250 |
| Number of Applications | | | 3 | 3 | 3 | 3 | 3 | 3 | 3 | 3 |
| Treating Time per Application, Hrs | | | 4 | 4 | 4 | 4 | 4 | 4 | 4 | 4 |
| Vol. of Water per Hourly Washing | | | 200 | 200 | 200 | 200 | 200 | 200 | 200 | 200 |
| Total Washing Time, Hrs | | | 104 | 80 | 95 | 73 | 68 | 78 | 100 | 50 |
| Properties of Catalyst | | | | | | | | | | |
| Density gm./cc | 0.645 | 0.696 | .708 | .676 | .679 | .682 | .760 | .806 | .724 | .698 |
| Coke Per Cent Wt. on Charge | 3.4 | 2.5 | 4.9 | 4.2 | 3.7 | 3.6 | 3.9 | 4.2 | 3.8 | 2.8 |
| Gas Per Cent Wt. on Charge | 3.8 | 2.3 | 6.4 | 6.9 | 4.7 | 4.7 | 5.5 | 6.0 | 5.7 | 3.7 |
| Activity | 38.5 | 28.9 | 40.7 | 39.4 | 38.1 | 36.0 | 36.8 | 39.0 | 38.8 | 30.7 | hours. The catalyst was drained and treated with a second application of 250 cc. of 19.5% aluminum sulphate for another 4 hours, then drained again and given a third application of aluminum sulphate for a similar period of time. The catalyst was then washed with 200 cc. of water each hour for 80 hours until free from soluble sulphate. The catalyst was dried and heated to a temperature of 1050° F. Upon analysis, it was found that In other examples, a deactivated silica-alumina clay catalyst having an activity of 30.0 was reactivated by soaking in sodium hydroxide solution, washing free of caustic and base exchanging with various solutions. The base-exchange operation was carried out in eight separate soaking periods of three hours each. The results are shown below, the general procedure being carried out as in Example 1.

TABLE II

| Example | Deactivated Catalyst Before Treatment | 11 | 12 | 13 | 14 | 15 | 16 | 17 |
|---|---|---|---|---|---|---|---|---|
| Soaking in 4% (Wt.) Sodium Hydroxide Soln.: | | | | | | | | |
| Soaking Time, Hr | | 24 | 5 min. | 24 | 24 | 24 | 24 | 24 |
| Vol. Soln. per Vol. Catalyst | | 1.1 | 1.1 | 1.1 | 1.1 | 1.1 | 1.1 | 1.1 |
| Base Exchanging: | | | | | | | | |
| Chemical Used | | | Al₂(SO₄)₃ | Al₂(SO₄)₃ | Th(NO₃)₄ | Zr(SO₄)₂ | Be(NO₃)₂ | LiCl |
| Conc. of Exchange Soln. Per Cent Wt | | | 20.6 | 20.6 | 30.5 | 18.7 | 30.5 | 19.2 |
| Total Vol. Soln. per Vol. Catalyst | | | 3.3 | 3.3 | 3.3 | 3.3 | 3.3 | 3.3 |
| Total Exchange Time, Hrs | | | 24 | 24 | 24 | 24 | 24 | 24 |
| Water Washing: | | | | | | | | |
| Washing Time, Hrs | | 57 | 56 | 56 | 56 | 56 | 56 | 56 |
| Total Vol. Soln. per Vol. Catalyst | | 143 | 139 | 140 | 139 | 139 | 139 | 139 |
| Properties of Catalyst: | | | | | | | | |
| Density, gm./cc | 0.72 | 0.68 | 0.71 | 0.70 | 0.72 | 0.70 | 0.69 | 0.68 |
| Gas, Per Cent Wt | 3.2 | 1.1 | 4.8 | 5.4 | 4.2 | 5.1 | 5.6 | 1.7 |
| Coke, Per Cent Wt | 2.6 | 1.6 | 3.0 | 2.9 | 3.2 | 3.7 | 3.9 | 1.6 |
| Activity | 30.0 | 14.3 | 32.0 | 36.2 | 34.1 | 36.9 | 36.3 | 20.3 | the sodium content of the catalyst had been reduced to 0.05% as a result of the base exchange with aluminum sulphate. The activity of reactivated catalyst was 37.9.

EXAMPLE 2

A volume of 300 cc. of a deactivated silica-alumina clay catalyst similar to that of Example 1

From the above examples, it will be seen that sodium hydroxide or sodium silicate may be employed as the soaking solution. Concentrations of sodium hydroxide from about 1% up to about 15% by weight may be used. The use of sodium hydroxide solutions of concentrations greater than 15% by weight results in disintegration of the clay catalyst due to partial decomposition of alumina-silicates. In general, a solution of sodium hydroxide at a concentration of 4% to 5% by weight is preferable for the purposes of the invention. While the preferred time of soaking in sodium hydroxide solution is for a period of about 24 hours, improvement in activity of the treated catalyst will result from soaking times of one hour or more. Beyond the 24 hour period, little improvement is noted, however, the catalyst to be reactivated may be permitted to soak for as long as 72 hours. It should be noted from Example 12 in Table II, in which the deactivated catalyst was treated with a 4% by weight solution of sodium hydroxide for 5 minutes, washed free of caustic and then exchanged with $Al_2(SO_4)_3$, that the activity was improved only slightly, indicating that the soaking period is essential if the improved results of this invention are to be obtained.

Sodium silicate has also been used as the soaking solution in concentration of from about 10% to about 25% by weight. Commercial "N" brand sodium silicate containing 8.9% $Na_2O$, 28.7% $SiO_2$ and 62.4% $H_2O$ by weight was employed in preparing the solutions, although other types of sodium silicate could likewise be used. The concentrations of sodium silicate are limited only by the convenience of handling, however, aqueous solutions containing 11% to 15% by weight proved preferable. The time of soaking, as in the case of sodium hydroxide may vary over a wide range, some improvement being obtained with a soaking period as low as one hour. The soaking period yielding the best results was about 48 hours.

For purposes of comparison, Example 10 was carried out omitting the soaking treatment; that is, the deactivated catalyst was treated directly with a 19.5% by weight solution of $Al_2(SO_4)_3$ for a total period of 12 hours, then washed free of sulphate, dried and heated to a temperature of 1050° F. The improvement in the reactivated catalyst was only slight, thus establishing the fact that a prior treatment with alkali metal hydroxide or silicate soaking solution is necessary to obtain the benefits of the present invention. In Example 11, the base-exchange operation was omitted, the deactivated clay catalyst being treated with a 4% by weight sodium hydroxide solution for 24 hours, washed free of caustic and dried. The activity of the treated catalyst was so low as to be ineffective for practical use. Thus, both soaking in an aqueous solution of an alkali metal compound an the base-exchange operation are essential to reactivate a spent hydrocarbon conversion catalyst in accordance with this invention.

The salts of various metals may be employed as base-exchange solutions. Thus, salts of beryllium, thorium, zirconium and aluminum have been used. The metallic salts employed are those of polyvalent metals. A monovalent metal salt, for example, lithium chloride, used in Example 17 in the base-exchange operation, did not yield the improved results of this invention. Aluminum sulphate may be used in concentrations up to 30% by weight as the base-exchange solution, although solutions of about 18% to 20% by weight have proved preferable. The extent of base exchange may vary over a period of from 1 to 72 hours. A 24 hour period of base exchange was found to be convenient and to yield excellent results and therefore is preferred.

In the reactivation of the spent alumina-silica catalysts using a sodium silicate solution and aluminum sulphate, a reactivated catalyst having a physical hardness appreciably higher than its hardness prior to the chemical treatment is obtained. Thus, the hardness index of the original catalyst used in Example 2 was 72.3, while the hardness index of the reactivated catalyst was 93.1. The hardness index was determined by a standard ball mill attrition test. Thus, in addition to reactivation, the above method using sodium silicate provides a means for improving the hardness characteristic of catalyst having low hardness indices.

While the hydroxide and silicate of sodium have been used in the above example for introducing zeolitic sodium into the deactivated catalyst, the hydroxides or silicates of any of the other alkali metals may likewise be employed. However, the sodium compounds being relatively inexpensive and easily available are preferable.

The invention is, of course, not limited to any theory of operation but the deposition or attachment of sodium or other alkali metal to the deactivated silica-alumina clays to form a true zeolite is believed to proceed by the following mechanism:

Generally, clay or synthetic catalysts of silica-alumina type can be represented at surface by the following structural formulas:

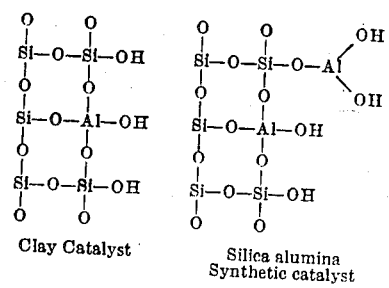

Clay Catalyst  Silica alumina Synthetic catalyst

Under service conditions, various influences and outside factors tend to diminish the catalytic properties of the catalysts. Among these are the gradual incorporation into the catalytic structure of certain harmful chemical elements, by means of base exchange, identical in mechanism with that used for the reactivation of catalysts. Letting X represent the harmful element, this can be pictured as follows:

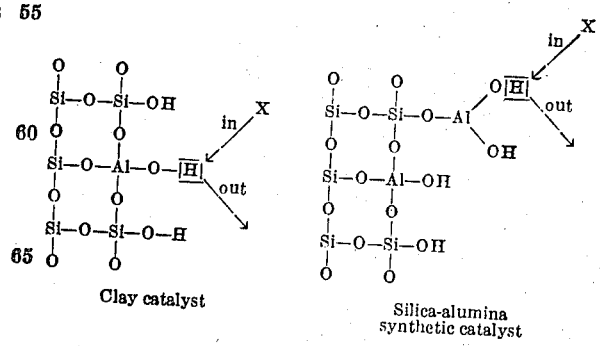

Clay catalyst  Silica-alumina synthetic catalyst

Treatment with sodium hydroxide or sodium silicate solution of the catalysts whose activity depreciated with use can be restored by first substituting sodium in place of the harmful element, thus restoring its zeolitic activity, and secondly displacing sodium in the zeolite, so formed, by an active element such as aluminum. These mechanisms are believed to proceed as follows:

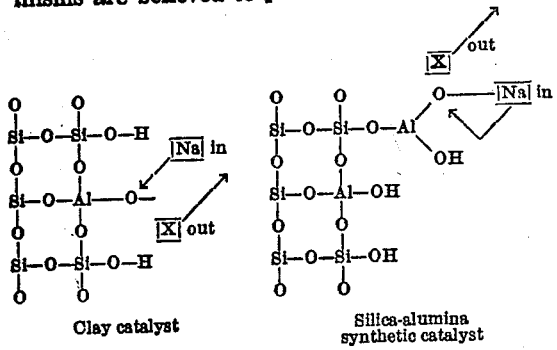

Clay catalyst            Silica-alumina synthetic catalyst

Substitution of active aluminum for the sodium introduced into the catalyst structure by the treatment with sodium hydroxide or sodium silicate is accomplished by a subsequent treatment with aluminum sulphate solution. The mechanism is apparently identical with the one pictured above.

From the previous discussion, it becomes apparent that the ability of the catalysts to be reactivated is intimately related to their ability to function as zeolites. To further establish that the replacement of sodium ions with aluminum ions was proceeding by a base-exchange process, an experiment was carried out as follows: One thousand cubic centimeters of crushed deactivated clay catalyst having a sodium content of .066% was treated with a 7% solution of sodium hydroxide and then water washed at a rate of 20 cc. per minute for 67 hours until a pH of 9.5 was reached. A 100 cc. sample of this treated catalyst was analyzed for sodium at this point and found to contain 0.32% sodium. A second 100 cc. sample was water washed for an additional 75½ hours at the rate of 1.33 cc. per minute until a pH of 8.8 was reached. The catalyst was then dried, and tempered at 1050° F. for one hour. The sodium content of this sample was 0.29%. A third sample of 550 cc. was soaked in 370 cc. of 16% by weight of aluminum sulphate for 24 hours at room temperature and then water washed at a rate of 11½ cc. per minute for 42½ hours until the catalyst was free of sulphate. This sample was dried, tempered at 1050° F. for one hour and upon analysis was found to contain 0.12% sodium. Thus, the sodium content of catalyst had been reduced 59% and this quantity of sodium replaced by aluminum in a base-exchange process.

An additional interesting experiment to show that caustic treatment effects the incorporation of base-exchangeable sodium in the clay catalyst was carried out by employing the catalyst as a water softening agent, and determining the amount of calcium carbonate removed per cubic foot of catalyst. This measurement would indicate the quantity of zeolitic sodium in the catalyst which could be replaced by calcium ions. The results are summarized in the following table:

BASE EXCHANGE CAPACITY OF CLAY CATALYST

*Grains CaCO₃ per cubic foot of catalyst*

| | |
|---|---|
| Unused catalyst | 1388 |
| Used catalyst | 1103 |
| Used catalyst treated with 7% NaOH and washed free of NaOH | 3969 |

The base exchange capacities of the catalysts were determined by a test consisting of passing water of known hardness content through the crushed catalysts (8/14 mesh) in 16 mm. tubes and measuring the hardness of the effluent with a standard soap solution.

Thus, by treating with sodium hydroxide an amount of zeolitic sodium can be introduced into the catalyst and later by replacement with other metals a reactivated catalyst is obtained.

We claim:

1. A process for reactivating a deactivated silica-alumina hydrocarbon conversion catalyst, comprising soaking the deactivated catalyst for a period of at least about one hour in an aqueous solution containing from about 1 to about 15 per cent by weight of alkali metal hydroxide, removing the catalyst from contact with the soaking solutions, water-washing the catalyst free of said solution, directly base exchanging the alkali metal so introduced into said catalyst with an aqueous solution of an aluminum salt and washing the catalyst free of said salt.

2. A process for reactivating a deactivated silica-alumina hydrocarbon conversion catalyst, comprising soaking the deactivated catalyst for a period of at least about one hour in an aqueous solution containing from about 1 to about 15 per cent by weight of alkali metal hydroxide, removing the catalyst from contact with the soaking solution, water-washing the catalyst free of said solution, directly base exchanging the alkali metal so introduced into said catalyst with an aqueous solution of a beryllium salt and washing the catalyst free of said salt.

3. A process for reactivating a deactivated silica-alumina hydrocarbon conversion catalyst, comprising soaking the deactivated catalyst for a period of at least about one hour in an aqueous solution containing from about 1 to about 15 per cent by weight of alkali metal hydroxide, removing the catalyst from contact with the soaking solution, water-washing the catalyst free of said solution, directly base exchanging the alkali metal so introduced into said catalyst with an aqueous solution of a zirconium salt and washing the catalyst free of said salt.

4. A process for reactivating a deactivated silica-alumina hydrocarbon conversion catalyst, comprising soaking the deactivated catalyst for a period of at least about one hour in an aqueous solution containing from about 10 to about 25 per cent by weight of alkali metal silicate, removing the catalyst from contact with the soaking solution, water-washing the catalyst free of said solution, directly base exchanging the alkali metal so introduced into said catalyst with an aqueous solution of an aluminum salt and washing the catalyst free of said salt.

5. A process for increasing the activity of a catalytic composition useful in hydrocarbon conversion operations, which comprises soaking a silica-alumina composite for a period of at least about one hour in an aqueous solution of an inorganic alkaline alkali metal compound, the concentration of which varies inversely with its alkalinity, said concentration being sufficient to effect the introduction of alkali metal into said composite but not exceeding about 25 per cent by weight, removing the composite from contact with the soaking solution, water-washing the composite free of said solution, base exchanging the alkali metal so introduced into said composite with a salt of a polyvalent metal and washing the resulting catalytic composition free of said salt.

6. A process for increasing the activity of a catalytic composition useful in hydrocarbon conversion operations, which comprises soaking a silica-alumina composite for a period of at least about one hour in an aqueous solution of an alkali metal hydroxide of concentration not exceeding about 15 per cent by weight but sufficient to effect the introduction of alkali metal into said composite, removing the composite from contact with the soaking solution, water-washing the composite free of said solution, base exchanging the alkali metal so introduced into said composite with a salt of a polyvalent metal and washing the resulting catalytic composition free of said salt.

7. A process for increasing the activity of a catalytic composition useful in hydrocarbon conversion operations, which comprises soaking a silica-alumina composite for a period of at least about one hour in an aqueous solution of an alkali metal silicate of concentration not exceeding about 25 per cent by weight but sufficient to effect the introduction of alkali metal into said composite, removing the composite from contact with the soaking solution, water-washing the composite free of said solution, base exchanging the alkali metal so introduced into said composite with a salt of a polyvalent metal and washing the resulting catalytic composition free of said salt.

ERNEST A. BODKIN.
JAMES M. JOHNSON.

REFERENCES CITED

The following references are of record in the file of this patent:

UNITED STATES PATENTS

| Number | Name | Date |
|---|---|---|
| 1,763,167 | Lowery | June 10, 1930 |
| 2,033,374 | Gayer | Mar. 10, 1936 |
| 2,059,553 | Churchill | Nov. 3, 1936 |
| 2,384,946 | Marisic | Sept. 18, 1945 |

FOREIGN PATENTS

| Number | Country | Date |
|---|---|---|
| 490,853 | Great Britain | Aug. 23, 1938 |
| 670,830 | Germany | Jan. 26, 1939 |